US008116250B2

(12) United States Patent  
Lindskog et al.

(10) Patent No.: US 8,116,250 B2
(45) Date of Patent: Feb. 14, 2012

(54) MEDIUM ACCESS CONTROL DISCARD NOTIFICATION

(75) Inventors: Jan Lindskog, Pixbo (SE); Roger Wallerius, Sävedalen (SE); Lars G Englund, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 670 days.

(21) Appl. No.: 12/307,877

(22) PCT Filed: Jul. 7, 2006

(86) PCT No.: PCT/IB2006/052301
§ 371 (c)(1),
(2), (4) Date: Jan. 7, 2009

(87) PCT Pub. No.: WO2008/007170
PCT Pub. Date: Jan. 17, 2008

(65) Prior Publication Data
US 2009/0310534 A1 Dec. 17, 2009

(51) Int. Cl.
*H04H 20/71* (2008.01)
(52) U.S. Cl. .................. 370/312
(58) Field of Classification Search ............ 370/312
See application file for complete search history.

(56) References Cited

U.S. PATENT DOCUMENTS

| 2002/0126629 A1* | 9/2002 | Jiang et al. ............... 370/328 |
| 2003/0015698 A1 | 1/2003 | Chang et al. |
| 2003/0016698 A1* | 1/2003 | Chang et al. ............. 370/469 |
| 2004/0208160 A1* | 10/2004 | Petrovic et al. ........... 370/350 |
| 2006/0164981 A1* | 7/2006 | Olsson et al. ............. 370/229 |
| 2006/0203760 A1 | 9/2006 | Fukui et al. |
| 2006/0251099 A1* | 11/2006 | Kim et al. .................. 370/432 |
| 2008/0285566 A1* | 11/2008 | Sammour et al. ......... 370/394 |
| 2009/0034466 A1* | 2/2009 | Lindskog et al. ......... 370/329 |

FOREIGN PATENT DOCUMENTS

JP 2004-312062 A 11/2004

(Continued)

OTHER PUBLICATIONS

3GPP. $3^{rd}$ Generation Partnership Project; Technical Specification Group Radio Access Network; Medium Access Control (MAC) Protocol Specification (Release 6). 3GPP TS 25.321 v6.9.0 Jun. 2006.

(Continued)

*Primary Examiner* — Kenny Lin
(74) *Attorney, Agent, or Firm* — Roger S. Burleigh

(57) ABSTRACT

A method is provided for a base station set (NODE B) adapted for RLC and MAC-hs signaling in acknowledged mode (AM), the base station set at least forwarding protocol data units (MAC-d PDU) from a Radio Network controller (RNC) to a user entity (UE), the method comprising the steps of monitoring (1) the MAC layer of the transmission entity of the base station set (1), if a MAC discard has occurred in the MAC layer (3), that is, protocol data units (PDU's) have been deleted in the input buffer of the base station set (NODE B), transmitting (7) a discard notification message from the MAC transmission entity in the base station set to the RLC layer of the radio network controller (RNC), indicative of the discarding of protocol data units. There is moreover provided a method for a radio network controller (RNC) adapted for RLC and MAC-hs signaling in acknowledged mode (AM) and a method for a user entity (UE) adapted for RLC and MAC-hs signaling.

5 Claims, 14 Drawing Sheets

FOREIGN PATENT DOCUMENTS

| | | |
|---|---|---|
| JP | 2005-149307 A | 6/2005 |
| WO | WO 2005-112357 A2 | 11/2005 |

OTHER PUBLICATIONS

3GPP. $3^{rd}$ Generation Partnership Project: Technical Specification Group Radio Access Network; UTRAN Iub Interface Node B Application Part (NBAP) Signalling (Release 6). 3GPP TS 25.433 v6.10.0 Jun. 2006.

3GPP. $3^{rd}$ Generation Partnership Project, Technical Specification Group Radio Access Network; High Speed Downlink Packet Access (HSDPA); Overall Description: Stage 2 (Release 7). 3GPP TS 25.308 v7.0.0 Mar. 2006.

* cited by examiner

MEDIUM ACCESS CONTROL DISCARD NOTIFICATION

FIELD OF THE INVENTION

The present invention relates to packet data traffic and signaling between a user entity (UE), a radio base station (Node-B) and a radio network controller (RNC). More particular the invention pertains to HSPDA (High Speed Packet Data Access) traffic making use of among others the MAC-hs (Medium Access Control High Speed) and RLC (Radio Link Control Layer) data transmission protocols.

BACKGROUND OF THE INVENTION

HSPDA provides high speed downlink access from an UMTS base station (Node B) to a plurality of user entities by flexible allocation of downlink resources.

In prior art document WO2005/03418 FIG. 3, the protocol layers involved in the communication between user entity (e.g. mobile station), Node B (base station), RNC (implemented by parts CRNC, and SRNC) has been shown. The user entity involves the following layers: PHY (physical layer), MAC-hs (HSPDA Media Access Control layer), MAC_d (Medium Access Control Device) RLC (Radio Link Control layer). Node B communicates via the MAC-hs layer with the user entity and via a frame protocol HS_DSCH-FP with the RNC, respectively.

According to the HSPDA specifications, the RLC operates above the MAC-hs protocol in the protocol stack. The RLC layer provides the connection to upper communication layers such as TCP/IP, both in the user entity and the RNC. Both the RLC protocol and the MAC-hs protocol are ARQ (Automatic Repeat Request) protocols featuring retransmissions of incorrectly received protocol data units.

As the name implies, the High Speed Downlink Packet Access (HSDPA) technology introduced in 3GPP provides substantial data capacity advantages. The technical specification 3GPP TS 25.321 concerns the MAC (Media Access Control) architecture and the various entities form a functional point of view. 3GPP 25.211 basically describes how information from the MAC-layers is mapped onto the channels sent out on the air.

In contrast with release 99 (GSM/EDGE) which exclusively defines channels between the RNC and the UE, HSPDA introduced the HS-DSCH (High Speed Dedicated Shared Channel) channel which are terminated between the user entity and the base station set (NODE B) also denoted Node B. The HSPDA Medium Access Control (MAC-hs) enables increased packet data throughput due to link adaptation (Adaptive Modulation Coding—i.e. 16 QAM or QPSK) and fast physical layer retransmission combining. Hence, besides incorporating the WCDMA access technology, Node B carries out scheduling and Hybrid Automatic Repeat Request (H-ARQ) retransmissions on the channel between the user entity and Node B. The benefits and the features of the above system have for instance been described in "WCDMA evolved—High Speed packet data services", by Stefan Parkwall et al., Ericsson review No. 2, 2003.

The HSPDA transmission makes use of a 2 ms transmission time interval (three time slots).

On the downlink side there is provided: Several common data channels 1, a Downlink Physical Channel (DPCH—R99) dedicated signal radio bearer 2 for each user entity using HSPDA transmissions; a common High Speed Shared Control Channel (HS-SCCH) for control signalling 3, a number of High Speed-Physical Downlink Shared Channels (HS-PD-SCH) common user data channels 4-5, which are allocated HSPDA data in a flexible manner.

On the uplink side there is provided: a High Speed-Dedicated Physical Control Channel (HS-PDCCH) 6—for, among other things, providing channel quality information, CQI, and HSPDA automatic request signalling—and an uplink dedicated channel associated with each HSPDA user comprising control information and data, 7.

HSDPA (High Speed Downlink Packet Access) facilitates high speed transmission on the downlink from Node-B and to the user entity (UE). Under HSPDA, Node-B buffers incoming downlink end-user data and utilises an internal scheduling entity to determine on which particular channel and when to transmit buffered data according to a scheduling routine. To aim in the scheduling decision, Node-B continuously receives channel quality estimates from the UE entities. Node-B also has knowledge about UE receive capabilities.

Node-B can transmit MAC-hs PDUs (Media Access Control High Speed Protocol Data Units) to the UEs at a pace of up to 500 times per second. At each 2 ms transmit opportunity (TTI transmit time interval) Node-B can vary the MAC-hs PDU size depending on the buffered amount of data, the channel quality estimates, the UE capabilities and the granted amount of downlink codes available. MAC-hs data for 1 UE up to 4 UEs can be scheduled at each 2 ms transmit opportunity utilising code division (WCDMA) among the scheduled UEs.

The UE decodes the HS-SCCH (High Speed Shared Control Channel), and upon a successful CRC checksum the UE continues to decode the HS-PDSCH (High Speed Physical Data Shared Channel). Depending on the outcome of the HS-SCCH and HS-PDSCH, the UE transmits a reception feedback back to the peer Node-B.

The reception feedback is interpreted by the Node-B transmitter, which upon a negative feedback or absence of feedback (DTX) indicating a possible reception failure for the UE, retransmits data.

According to specification 3GPP 25.321 chapter 11.6.1 and 11.6.2, there is utilized a HSPDA N-channel stop and wait (SAW) ARQ, implying that a number of 1-8 HARQ processes may exist at a time per user entity. The timing relation between the downlink HS-DPCCH channel and the uplink ACK/NACK transmissions on the HS-PDSCH are fixed, that is, the ACK, NACK messages are arranged to be transmitted, such that there are always 7,5-9,5 TTI slots between a transmission and the associated expected ACK/NACK from a user entity. This allows for Node-B to easily determine when to retransmit data in the case of a missing response to a first transmission. The 8 HARQ processes mentioned above corresponds to the number of downlink transmissions to a given entity which can be accomplished before the NACK/ACK pertaining to the first downlink transmission is received at the base station.

Base Station and User Entity

In FIGS. 12 and 13, diagram of a base station set (Node B) and a user entity (UE), respectively, are shown.

The base station set, node B, comprises a MAC-hs control message handler, a scheduler, a number of input buffers storing segments of data streams pertaining to individual user entities, UE1-UEn, corresponding to a number of HARQ processes for handling simultaneous transmissions to several UE's, that is, for each user entity as well, Layer 1 processing means for transferring data from respective HARQ processes. The base station moreover comprises a CQI decoder, a user entity (UE) feedback decoder and a layer 1 receiver.

Each HARQ process in a given user entity is mirrored in Node B, and corresponds to a given data stream which is received by a particular user entity. As explained above, more data streams may be used by the user simultaneously corresponding to one application or more simultaneous applications running on the user entity apparatus, possibly with different QoS requirements. Moreover, consecutive data may be transmitted for the same user entity, the consecutive transmission belonging to different HARQ processes.

Moreover, Node B comprises at least one specific input buffer queue dedicated to a corresponding set of HARQ processes.

In FIG. 13, a user entity (MAC) arrangement according to the invention is shown comprising HS-SCCH decoding means, for decoding the downlink HD-PDSCH channel, arrangements consisting of a number J of HARQ processes, a number N of reordering and disassembly queues and a RLC (Radio Link Control) layer means. Moreover, there is provided UE (User Entity) feedback processing means and layer 1 processing for providing feed-back on the HS-DPCCH channel.

The reordering queue distribution function routes the MAC-hs PDU's to the correct reordering buffer based on a Queue ID. The reordering entity reorders received MAC-hs PDU's according to the received TSN (transmit sequence number). MAC-hs PDU's with ascending TSN's (MAC hs Transmit Sequence Numbers) are delivered to the disassembly function. To recover from erroneous conditions when MAC-hs PDU are missing the same avoidance handling as described in 3GPP TS 25.321-11.6.2, re-ordering release timer and window based stall avoidance, shall be used. There is one reordering entity for each Queue ID configured at the UE. The disassembly entity is responsible for the disassembly of MAC-hs PDU's. When a MAC-hd header is removed, the MAC-d PDU's are extracted and any padding bits are removed. Then the MAC-d PDUs are delivered to the higher (RLC) layer. These features have been described in 3GPP TS 25.321-11.6.2.3.

The RLC Layer

The RLC layer in 3GPP can operate in three modes, transparent mode, unacknowledged mode and acknowledged mode (AM), which will be focused upon in the following.

In AM mode, incorrectly received PDU's (Protocol Data Units) discovered by the receiving side are effected to be retransmitted by the transmitting side by means of an ARQ (Automatic Repeat Request) protocol.

An AM RLC entity consists of a transmitting side, and a receiving side, where the transmitting side of the AM RLC entity transmits RLC PDU's and the receiving side of the AM RLC entity receives RLC PDU's.

An AM RLC entity resides in the UE (user equipment) and in the RNC (radio network control), respectively. The transmitting side segments and/or concatenates RLC SDU's (service data units) into PDU's of a fixed length. The receiving side reassembles received PDU's into RLC SDU's and transmits these to higher data layers. Likewise, SDU's are received from the layer above the RLC layer. In AM mode, the RLC layer is responsible for the delivery of SDU's in consecutive order.

In FIG. 4 of the above document WO2005/034418, an implementation of the acknowledged mode (AM) UE (base station)/UTRAN (Radio access node/base station (Node B)) entity is shown.

To facilitate the in-sequence delivery, each RLC PDU is given a sequence number, 0-4095, whereby the transmitter transmits PDU's with increasing sequence number modulo 4096. Using the sequence number, the receiver can detect a missing PDU. The receiver can be configured to transmit a STATUS message upon the detection of a missing PDU. The STATUS report may contain positive or negative acknowledgement of individual RLC PDU's received by the peer RLC entity. The transmitter can also request a STATUS messages from the receiver by setting a Poll flag in the PDU header. The conditions for that the transmitter sets the Poll flag are among others:

Last PDU in Buffer.
  When only one PDU exists in the input buffer.
Poll Timer Expires.
  When the timer_poll expires, that is, the transmitter requested a STATUS earlier and initiated a timer_poll to reassure that a response is received.
Window Based.
  A transmitter is restricted in the amount of "outstanding data" it can transmit until a STATUS confirms the reception to the receiving side. "Outstanding data" relates to the earliest unacknowledged PDU.

Note that the above description of the functionality of the RLC layer only constitutes a small excerpt of those features actually provided.

Selective retransmissions are possible, e.g. if STATUS message indicates PDU with sequence number (SN) 3, 6 and 13 are missing, only 3, 6 and 13 needs to be retransmitted.

MAC-hs Layer

In the following description regarding the MAC-hs layer:
  the MAC-hs transmitter is the Node-B.
  the MAC-hs receiver is the UE equipment being either a mobile station or a pc-card attached to a PC or any other equipment capable of receiving downlink 3GPP HSDPA traffic.

MAC-hs PDU's are numbered by modulo TSN (Transport Sequence Number) cycling through the field 0 to 63.

As mentioned above, the MAC-hs protocol provides multiple Hybrid-ARQ processes (HARQ) whereby for each HARQ process, the transmitter transmits a MAC-hs PDU and awaits either an ACK indicative of reception at the receiver or Negative Acknowledgement (NACK) indicative that the receiver did not receive the MAC-hs PDU or absence of a response (DTX). The round trip time concerning the time from MAC-hs PDU transmission until reception of the feedback (ACK/NACK) is fixed. Upon the reception of a NACK or DTX, the MAC-hs transmitter retransmits the MAC-hs PDU. Since the round trip time is long in relation to the MAC-HS PDU size and since multiple users may be adapted to receive packets in time multiplexed fashion, multiple HARQ processes are provided. If only one HARQ process was available, the duty cycle (i.e. actual transmission time/ total possible transmission time) would be low. By using multiple HARQ processes, one HARQ process can await a response, while another HARQ process, or multiple HARQ processes, may transmit. Thereby, the duty cycle can be rendered close to 100 percent.

The MAC-hs protocol is semi-reliable, that is, the MAC-hs transmitter may choose to discard or delete a MAC-hs PDU that has been transmitted and possibly been retransmitted to the MAC-hs receiver.

By discarding a MAC-hs for retransmission, unnecessary transmissions are prevented over the radio link in case the MAC-hs receiver has moved to another cell or has powered down or if the receiver for any other reason is not capable of receiving data. Therefore, buffered packets are discarded at the transmitter either at the expiry of a timer set at a predetermined time (e.g. T1) corresponding to the first transmission of the packet in question or when a maximum number of retransmissions of the packet in question have been performed or based upon a too long waiting time in the input data buffer, whatever appears first or a combination thereof.

The MAC-hs receiver utilizes a receiver window for the purpose of mitigating the effect of unnecessary transmissions when PDU's are received in non-ascending sequence order (which can occur due to retransmissions). Whenever a MAC-hs PDU is successfully received with a TSN (Transmit Sequence Number) equal to the next expected TSN, the receiver can deliver PDU's to the RLC layer. Depending on whether the subsequent TSN number (i.e. next expected TSN+1) has already been successfully received, that MAC-hs PDU can also be delivered and so forth. The receiver window is updated accordingly. Delivery to the RLC layer from the MAC-hs protocol is done in consecutive order, also denoted in-sequence.

To recover from the situation where e.g. the transmitter has discarded a MAC-hs PDU, the receiver utilizes two mechanisms I)+II) to solve the problem:

I) Timer Based Stall Avoidance:

At the reception of a PDU with TSN>next_expected_TSN the receiver starts a timer denoted T1. When the timer expires, the receiver makes proper actions to allow for subsequent PDU's to be received. The exact details are described in 3GPP 25.321 Chapter 11.6.2.3.2. The behavior is shown in FIG. 1.

At time 1) a PDU with TSN=4 is received, the next expected transmit sequence number being 3, whereby timer T1 starts.

At time 2) PDU's with TSN 6 and 7 are received.

At time 3), the timer expires, whereby TSN=4 is delivered to the RLC layer. Next expected_TSN=5. A new timer T1 starts since next_expected_TSN=5 is not received and at least one PDU exists in receiver window.

4) TSN 6 and 7 remains in buffer.

II) Window Based Stall Avoidance:

Upon the reception of a PDU with TSN outside the receiver window, the receiver shall shift its "right" (or "upper") window edge and highest_received_TSN to the received TSN. Next_expected_TSN shall be updated to highest_received_TSN−receiver window size+1| previously PDU's stored in window that now fall outside the window shall be delivered to RLC layer. This has been illustrated in FIG. 2.

Assume that the receiver window size is of length 8.

At time 1) PDU TSN 4 has been received, which is within the receiver window, TSN=3 is next_expected_TSN, timer T1 is running.

At time 2) TSN=12 is received, which is outside the receiver window thus causing the window to advance, the next_expected_TSN is updated, and PDU TSN=4 is delivered to RLC. A new timer T1 starts since next_expected_TSN is not received and a PDU exists in the receiver window.

MAC-hs Reset:

MAC-hs is used to restart the MAC-hs protocol, where the MAC-hs receiver delivers stored data in its receiver window to RLC layer and sets its next_expected_TSN=0 and highest_received_TSN=63. It is used upon conditions such as handover between cells.

Problems with Existing Solutions

Assume the case when a TCP session is started from the fixed network to a peer user residing in a 3GPP HSDPA network having e.g. a pc-card inserted in a laptop. The TCP transmitter at the fixed network starts by transmitting very low amount of data. Assume further that the RLC layer resides in the Radio Network Controller (RNC) and that it transmits the data to Node-B within 2 RLC PDU's. The two PDU's are first stored in Node-B incoming data buffer. FIG. 3 shows the situation.

Assume moreover, that Node-B transmits both RLC PDU's in one MAC-hs PDU with TSN=0. Assume now that the transmission fails and Node-B repeats transmission of the PDU until it is finally discarded at the Node-B. Node-B then advances its window to sequence number 1 as its BoW (Bottom of Window). FIG. 4 shows the situation.

When subsequently the RLC poll timer expires and RLC retransmits the last RLC PDU (TSN=46). Node-B will receive the RLC PDU data, and transmit the data in one MAC-hs PDU to UE. Assume successful reception occurs. UE will start its T1 timer since received TSN<>next_expected_TSN.

It is assumed that the time from the first transmission in Node-B until Node-B discards a MAC-hs PDU is shorter than Poll_timer to avoid that duplicate RLC PDU's are buffered in Node-B. FIG. 5 shows the situation.

If we now assume that T1 timer in MAC-hs receiver<Poll timer in RLC, subsequently the T1 timer in UE will expire and the PDU will be received by RLC receiver (RLC TSN=46). RLC receiver in UE will transmit a STATUS message indicating the absent RLC PDU with TSN=45. RLC transmitter will then retransmit RLC PDU with TSN=45 and upon successful reception at the UE MAC-hs receiver RLC layer can deliver RLC PDU's 45 and 46 to higher layer.

An other scenario can occur if T1 timer in MAC-hs receiver>Poll timer in RLC then yet another RLC PDU 46 will be sent—but since T1 timer is still running nothing will be sent to RLC receiver until T1 expires. When T1 expires in the UE multiple copies of TSN 46 will be received by the RLC receiver.

As described above, the UE will now send a STATUS indicating the absence of TSN=45, and upon the reception of the STATUS message in RLC, the RLC will retransmit the TSN=45. If we assume successful delivery of the RLC PDU with TSN=45 via the MAC-hs layer the UE RLC layer can now deliver the complete data sequence TSN=45 and 46 to its upper layer.

We can conclude that the delay until the PDU's are correctly received at the RLC receiver is Poll_timer+RLC PDU transmit time from RLC in RNC to MAC-hs in UE+T1 timer in UE+STATUS control message UL transmit time from UE to RLC+RLC PDU transmit time from RLC in RNC to RLC in UE.

For the case of a higher traffic load, e.g. when TCP is running at high speed, the problem will be less noticeable, because the UE will more likely start its T1 timer because more transmission occurs between Node-B and UE. For a high load traffic case, either the 1st (timer based) or 2nd (window based) recovery mechanism will cause Ue to deliver data to RLC. If configured to transmit STATUS upon missing PDU's, the UE will send a STATUS. The transmit RLC entity will then receive a STATUS message prior to that the poll_timer expires.

In conclusion, where two ARQ (Automatic Repeat Request) in-sequence delivery protocol layers operate in the same protocol stack, and when the underlying ARQ protocol discard data, the above problem of data delay, as seen by the application operating above the two ARQ protocols, can occur. If the problem occurs during low traffic load situations it may cause a relatively long delay until an automatic resolution occurs.

SUMMARY OF THE INVENTION

It is a first object of the invention to obviate the time lag which may occur in systems having two protocol layers, each respective layer operating in accordance with acknowledge/non acknowledge signaling.

This object has been accomplished by the method set forth for a base station set (NODE B) adapted for RLC and MAC-hs signaling in acknowledged mode (AM), the base station set at least forwarding protocol data units (MAC-d PDU) from a Radio Network controller (RNC) to a user entity (UE), the method comprising the steps of monitoring (1) the MAC layer of the transmission entity of the base station set, if a MAC discard has occurred in the MAC layer, transmitting a discard notification message from the MAC transmission entity in the base station set to the RLC layer of the radio network controller (RNC), indicative of the discarding of protocol data units.

The above object has also been accomplished by a method for a base station set (NODE B) adapted for RLC and MAC-hs signaling, the base station set communicating with a user entity and a Radio Network controller in acknowledged mode, the method comprising the steps of monitoring the MAC layer of the transmission entity of the base station set, if a MAC discard has occurred in the MAC layer, transmitting a MAC-hs_b reset message to the MAC receiver of a user entity.

This object has moreover been accomplished alternatively by a user entity adapted for RLC and MAC-hs signaling, in which a Radio Network controller at least forwarding protocol data units to a base station set for further forwarding to the user entity the method comprising the steps of when receiving a MAC-hs_b RESET message, resetting next expected transmit sequence number (TSO) to 0, resetting the highest-received transmit sequence number to 63, delivering all received RLC protocol data units (PDU) to the RLC layer of the user entity, transmitting an acknowledge message to the base station.

Additional advantages will appear from the following detailed description of the invention.

DETAILED DESCRIPTION OF PREFERRED EMBODIMENTS OF THE INVENTION

According to the present invention, various solutions are set forth for discovering when the above problem associated with the prior art occurs and for providing explicit signaling to recover faster from the erroneous situation.

Embodiment 1

According to a first embodiment of the invention in order to mitigate the effect of the data discarding discussed above, Node-B indicates up to the RLC layer that a PDU discard has appeared with a Node-B discard notification message. This notification takes place when Node-B performs a discard of MAC-hs PDU(s). According to the invention, the signaling may take place as a new IE (Information Element) in an existing control message in uplink direction, or as a new control message. Following the reception of the discard notification, the RLC transmission entity decides what action to take.

Figure 9:
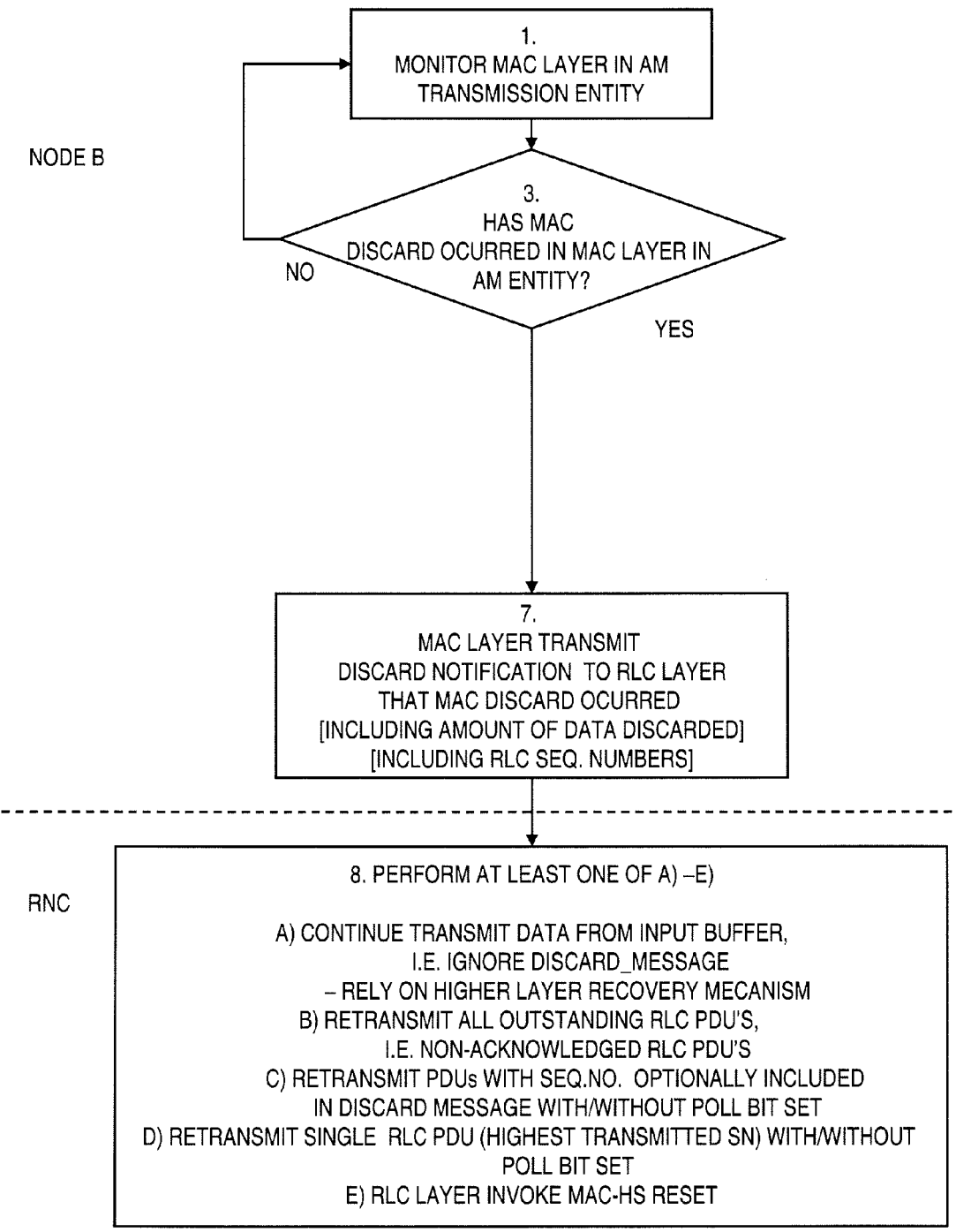
FIG. 9 shows a flow diagram pertaining to a first, second and third embodiment of the invention.

In FIG. 9, a flow diagram pertaining to the procedure carried out in Node B is illustrated.

In step 1, node B monitors the MAC layer in acknowledged mode of the transmission entity.

If a MAC discard has occurred in the MAC layer in the AM transmission entity, step 3, node B proceeds directly to step 7 wherein the MAC layer of node B transmits a Discard notification message to the RLC layer of the RNC, indicating that a MAC discard occurred in the MAC layer.

Optionally, in step 7, the Discard notification message comprises a signaling of the amount of data discarded, and also optionally comprises the RLC sequence numbers of the discarded PDU's in question.

Subsequently, the RLC transmission layer entity in the RNC acts on the discard notification, step 8, whereby the RNC transmission entity performs at least one of the following steps:

A) Ignore the Discard notification and continue to transmit data from the input buffer—if more date is present in the input buffer. If no data is present in the input buffer, the RNC may also ignore the Discard notification. This means that the RNC relies on existing higher layer protocols for retransmission of missing PDU's or may also be due to absence of handling means for the Discard message, B) transmitting all outstanding RLC PDU's, that is, re-transmitting all transmitted but non-acknowledged PDU's and set the poll bit on the last PDU, C) re-transmitting PDU's with sequence number optionally included in the Discard notification with the poll bit set on the last PDU, D) re-transmitting a single RLC PDU (highest transmitted sequence number (SN)) with the poll bit set or without the poll bit set if pending RLC PDU's awaits transmission, E) invoking a MAC-HS reset, which will cause the MAC-hs receiver to deliver data to RLC receiver.

Embodiment 2

Figure 10:
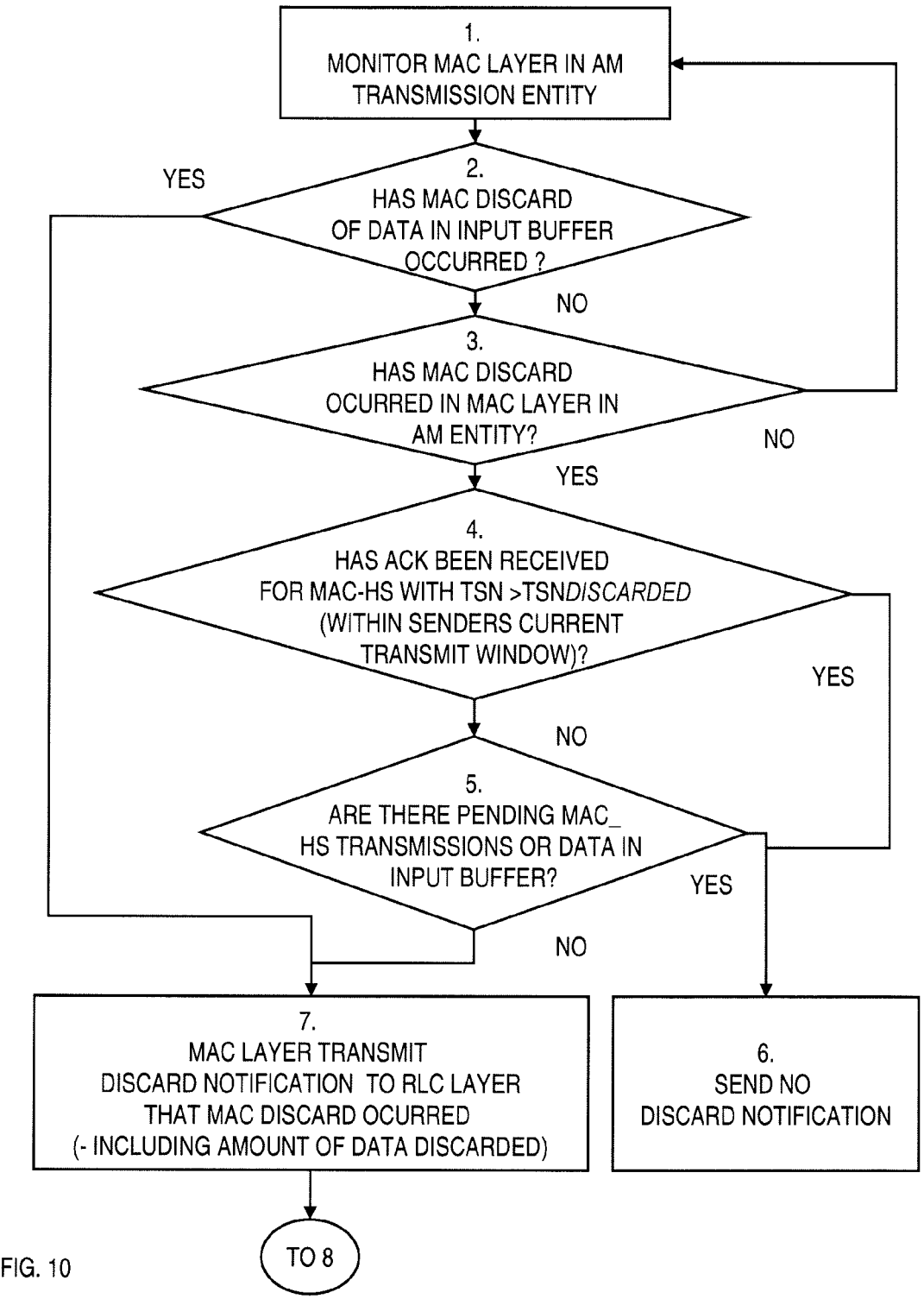
FIG. 10 shows a flow diagram pertaining to a second embodiment of the invention.

In FIG. 10, a second embodiment of the invention is shown.

According to a second embodiment of the invention, having steps of the same reference numbers in common with the first embodiment, the following procedure is carried out:

In step 1, node B monitors the MAC layer in acknowledged mode of the transmission entity.

If a MAC discard of a MAC-d PDU occurs in the input buffer in Node-B i.e. a transmission to the UE has not occurred yet of this MAC-d PDU, step 2, the procedure goes to step 7, otherwise it goes to step 3.

In step 3, it is tested if a MAC discard has occurred in the MAC layer in the acknowledged mode entity, if no the procedure goes to step 1, if yes the procedure proceeds to step 4.

In step 4, it is examined if an acknowledge (ACK) has been received for MAC-HS with transmit sequence number (TSN) larger than the transmit sequence number of the discarded MAC-hs PDU but within senders transmit window. If no, proceed to step 5, if yes proceed to step 6. It is noted that the reason for not transmitting the discard notification, as will be the effect when moving to step 6 from step 4, is due to the fact that the UE has started its T1 timer, and that the UE will inform the RLC layer of the missing PDU upon the expiration of the T1 timer.

In step 5 it is examined if there are pending MAC-HS transmissions or data in the input buffer. If yes proceed to step 6, if no proceed to step 7. It is that the reason for proceeding to step 6 from step 5*l* is due to the fact that Node-B will generally transmit MAC-hs in ascending TSN number order. Prior to a transmit attempt of a MAC-hs for an UE, Node-B will try to select lowest possible TSN in Node B transmit window. This means that if a discard occurs for e.g. TSN=n, it is not likely that Node-B has pending MAC-hs transmissions for TSN<n. Likewise, if received but not yet transmitted MAC-d PDU's occur these PDU's will be sent with TSN>n. As will be appreciated by those skilled in the art, TSN is counted modulo 64 which must be taken into account in the example given above.

In step 6, no discard notification is transmitted.

In step 7, a MAC layer transmit discard notification to the RLC layer is transmitted, informing that a Discard occurred, and optionally including the amount of data discarded. The procedure continues in step 8, shown and described under step 8 in FIG. 9, such that Node-B will according to the second embodiment of the invention transmit the Node-B discard notification message in the same manner and with the same subsequent steps as explained above.

Compared to the first embodiment this embodiment, the second embodiment of the invention reduces the signaling between Node-B and the RNC.

Embodiment 3

To help the transmit RLC entity in its decision, the Node-B discard notification message comprises the amount of data discarded by the Node-B. Alternatively, by investigating the MAC-d PDU, Node-B can decode the RLC sequence number and specify the discarded sequence numbers.

This option has been indicated in FIG. 9 in step 7. The RNC can, by using this information, estimate which RLC PDU's that require retransmission, or, if the RLC sequence numbers are provided retransmit only those PDU's that were discarded.

Embodiment 4

Figure 11:
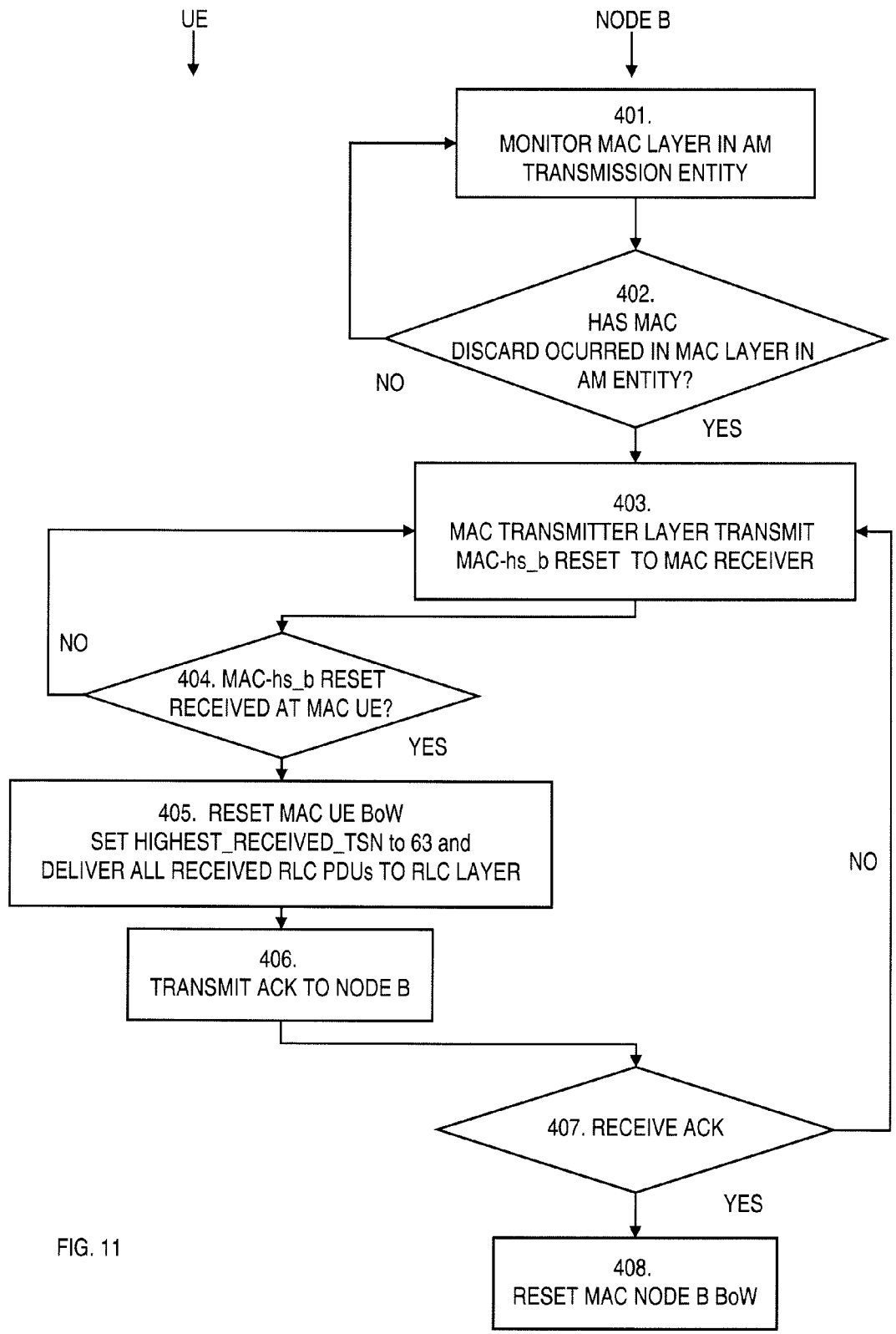
FIG. 11 shows a flow diagram pertaining to a fourth embodiment of the invention.
Figure 12:
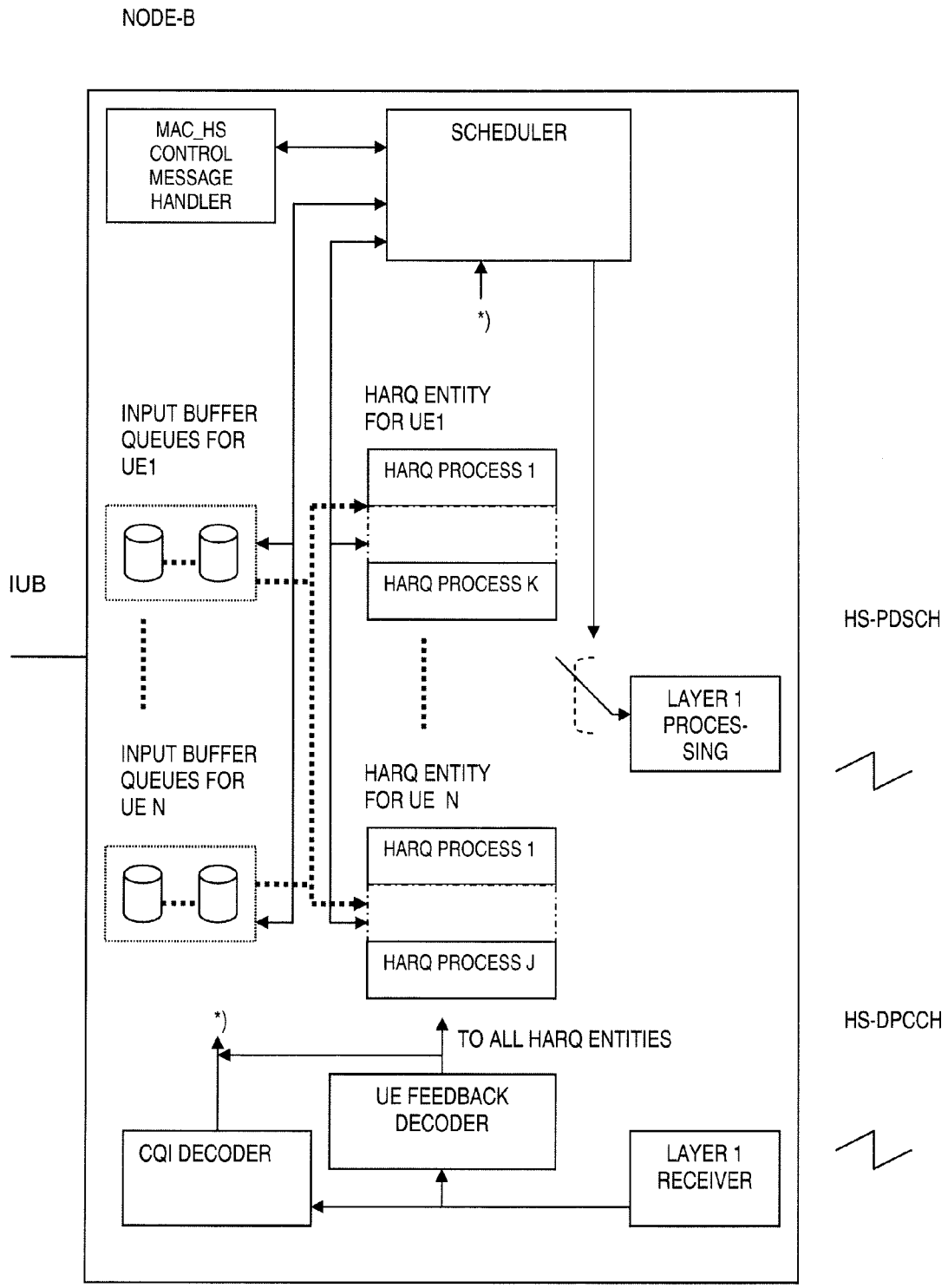
FIG. 12 shows a base station according to the invention.
Figure 13:
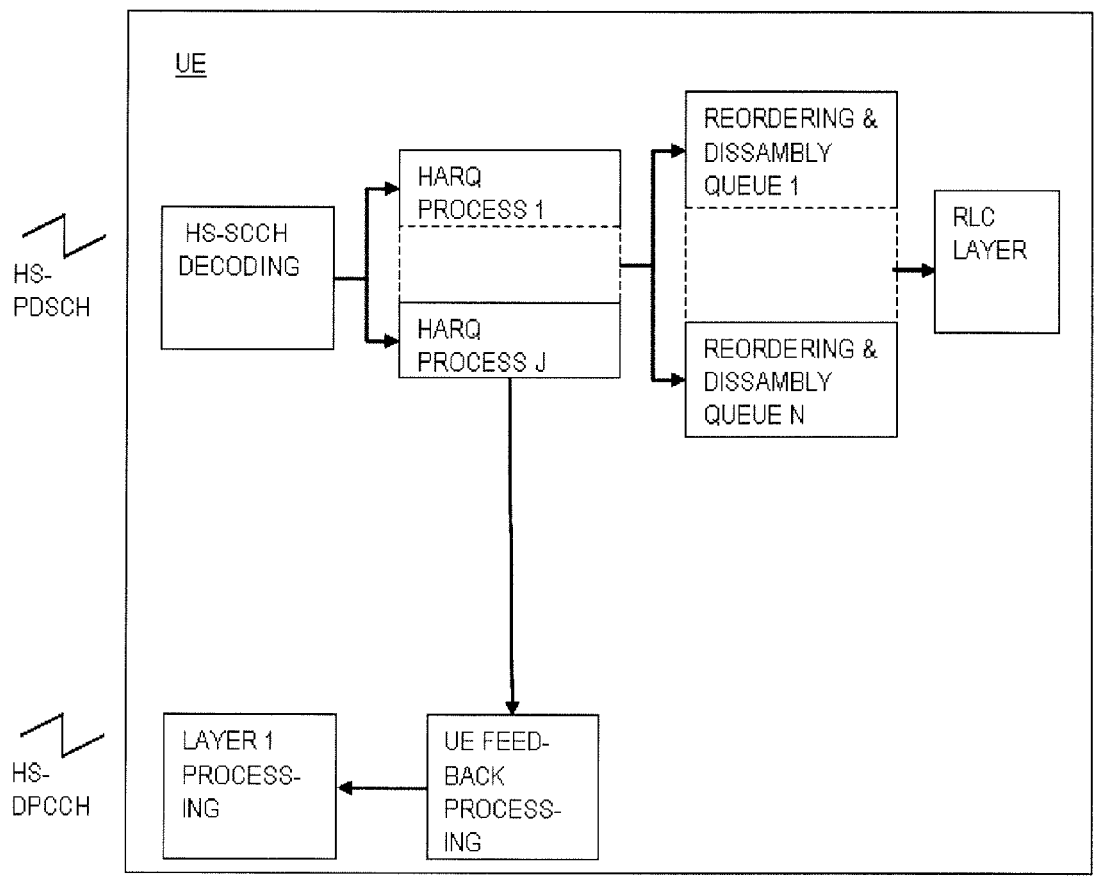
FIG. 13 shows a user entity according to the invention.

An alternative MAC-hs reset is defined as a control message that can be transmitted from the Node-B, denoted MAC-hsb_reset. This procedure is illustrated in FIG. 11. The user entity UE is the receiver and Node B is the transmitter.

In step 401, the MAC layer in the AM transmission entity is monitored.

If a MAC discard occurs, step 402, in the MAC layer, the MAC transmitter entity transmits a MAC-hsb_reset message according to the invention to the MAC-hs user entity receiver, step 403. The message is transmitted to the user entity UE from Node-B. Otherwise the procedure goes to step 401.

Upon reception of the MAC-hsb_reset, 404, the MAC-hs receiver shall reset its next_expected_TSN to 0 and highest-received_TSN to 63 and deliver all received RLC PDU's up to RLC layer, 405. The MAC-hsb_reset message shall subsequently be acknowledged by the user entity UE, 406.

Upon reception of the acknowledgement 407, the MAC-hs transmitter shall set its transmitter BoW to 0, step 408.

The transmitter shall repeat the message upon a negative acknowledgement, cf. step 404, to reassure that the receiver successfully receives the message. During the MAC-hsb_reset transmission and time until an acknowledgement is received, no other transmissions shall occur. This is to avoid any ambiguities of the TSN interpretation.

The MAC-hsb_reset may also be used periodically during time when no data is transmitted for the particular UE. This may be used to ensure that transmitter and receiver has the same interpretation of BoW.

Figure 1:
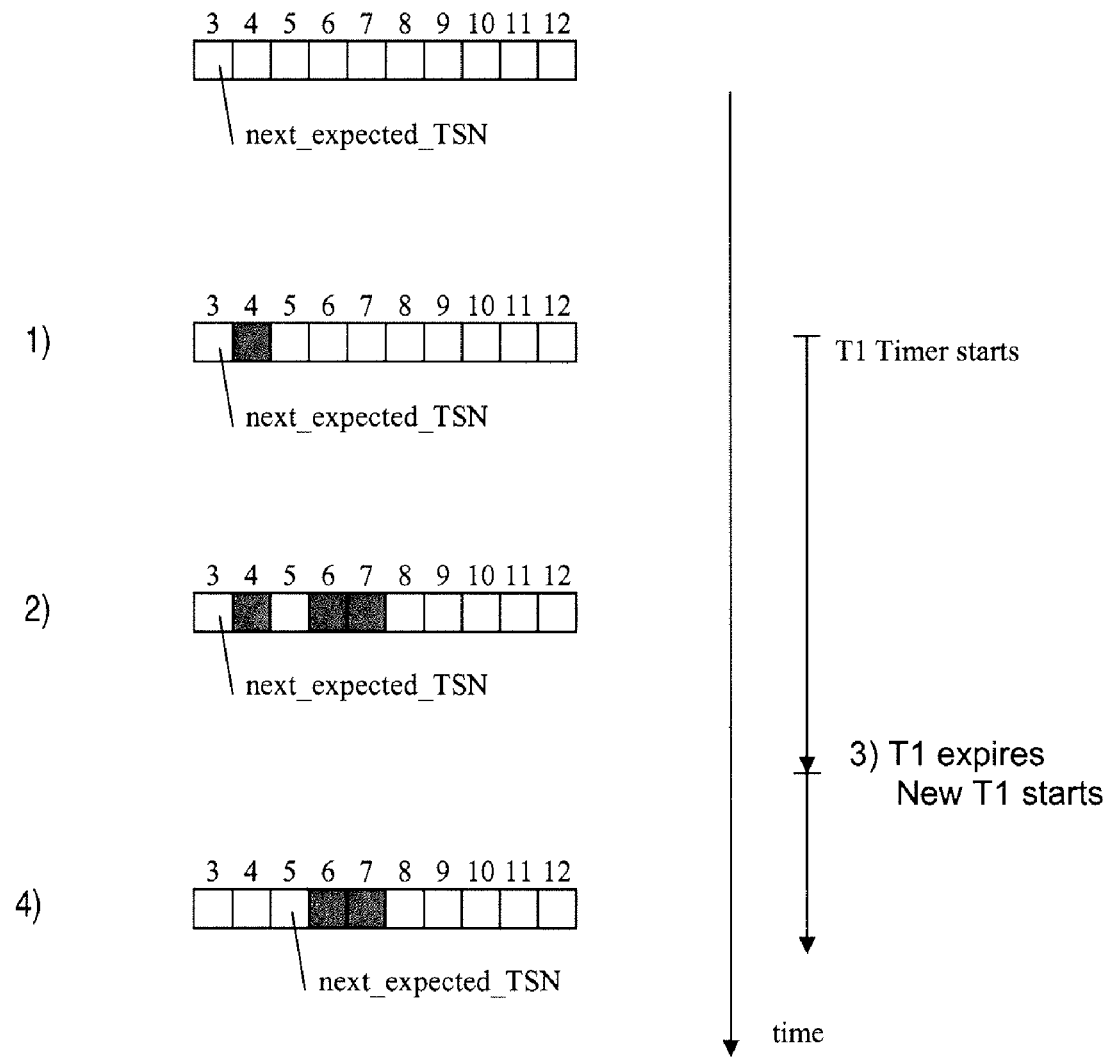
FIG. 1 shows a prior art T1 timer based stall avoidance.
Figure 2:
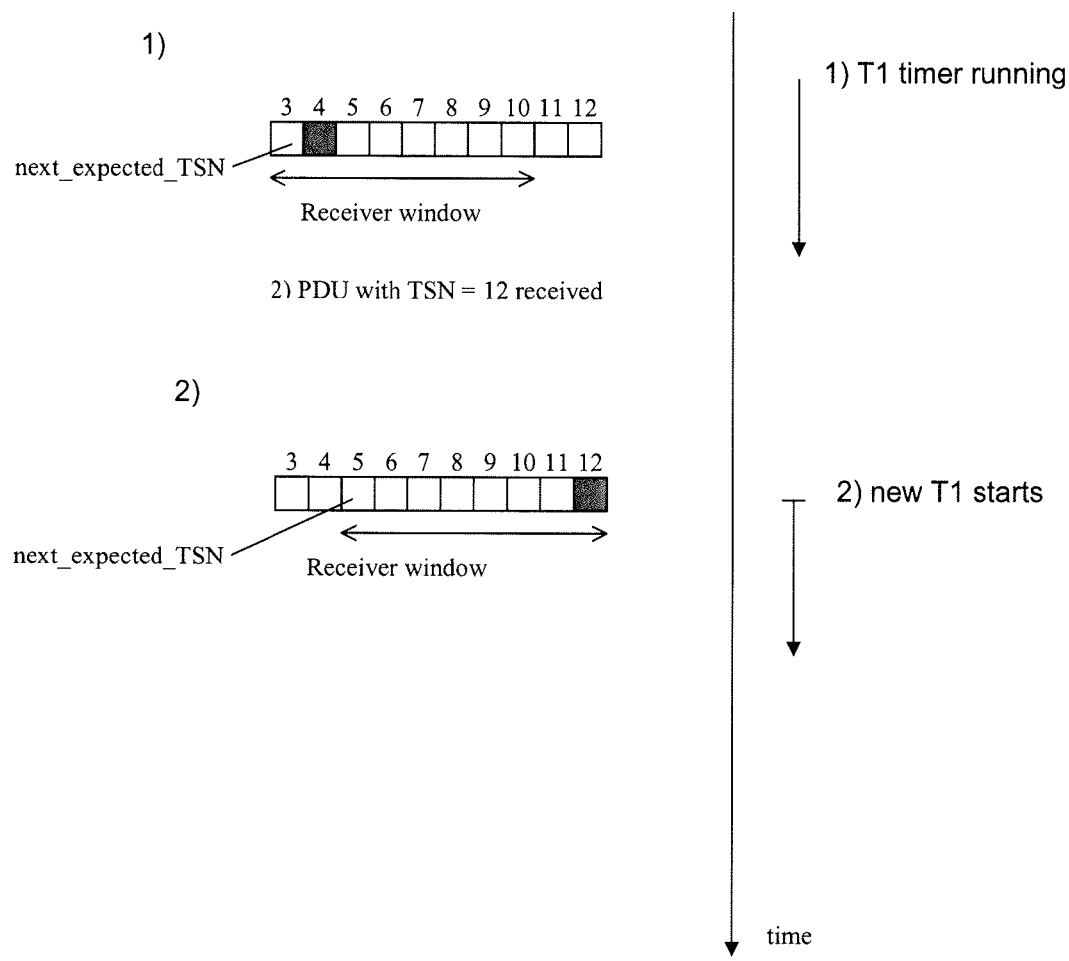
FIG. 2 shows a prior art window based stall avoidance.
Figure 3:
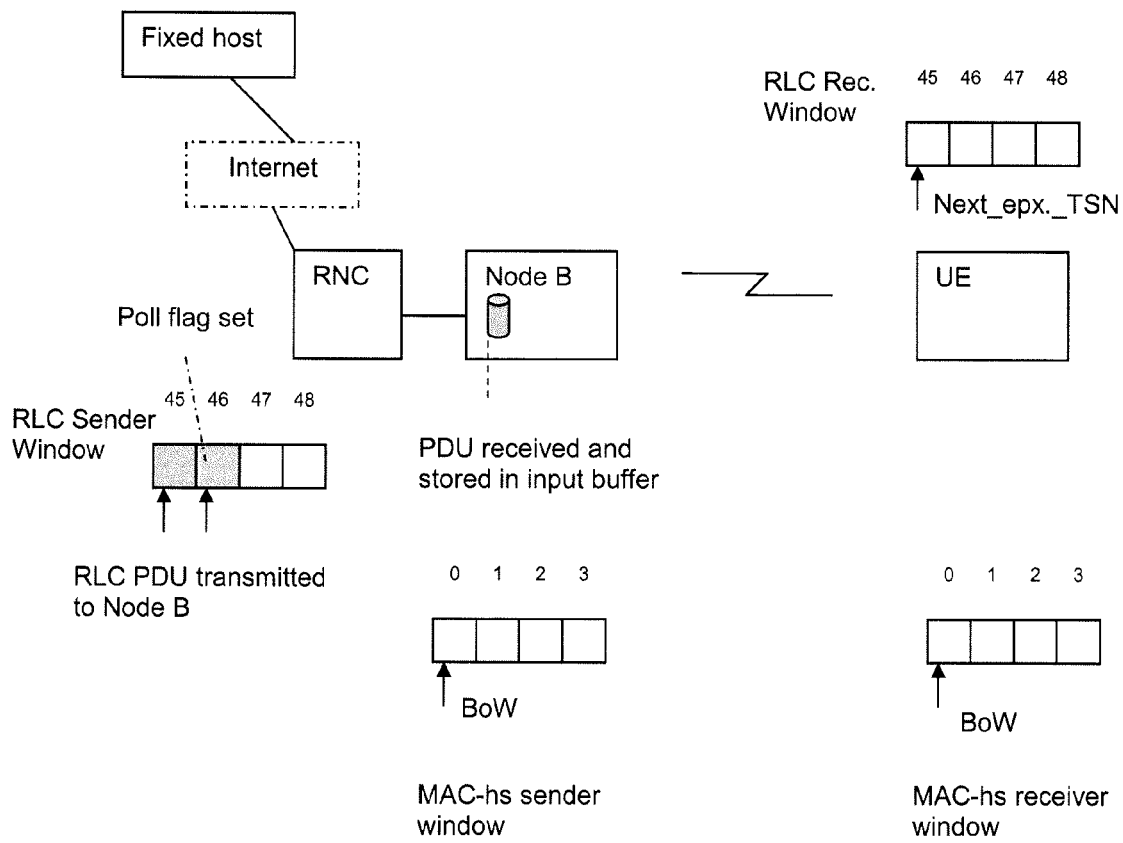
FIG. 3-5 shows a problem associated with a possible known scenario in the prior art, FIGS. 6a+6b shows an exemplary scenario according to the invention.
Figure 4:
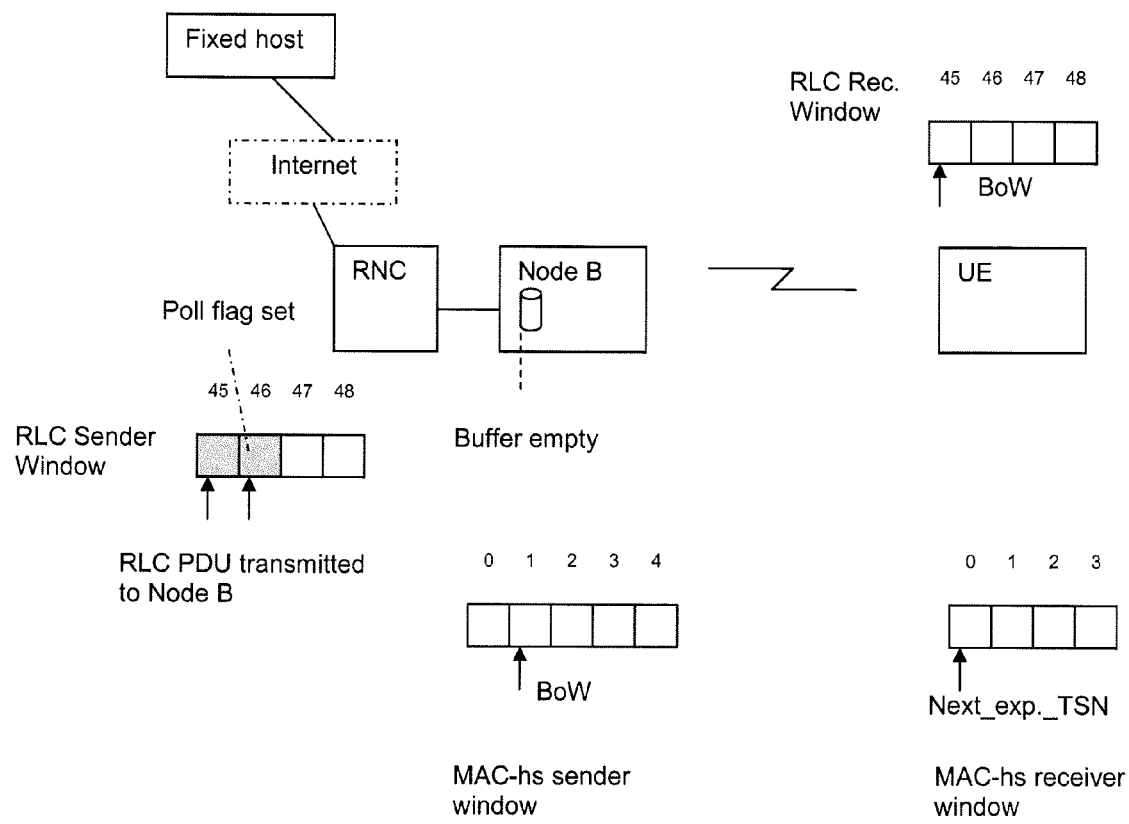
Figure 5:
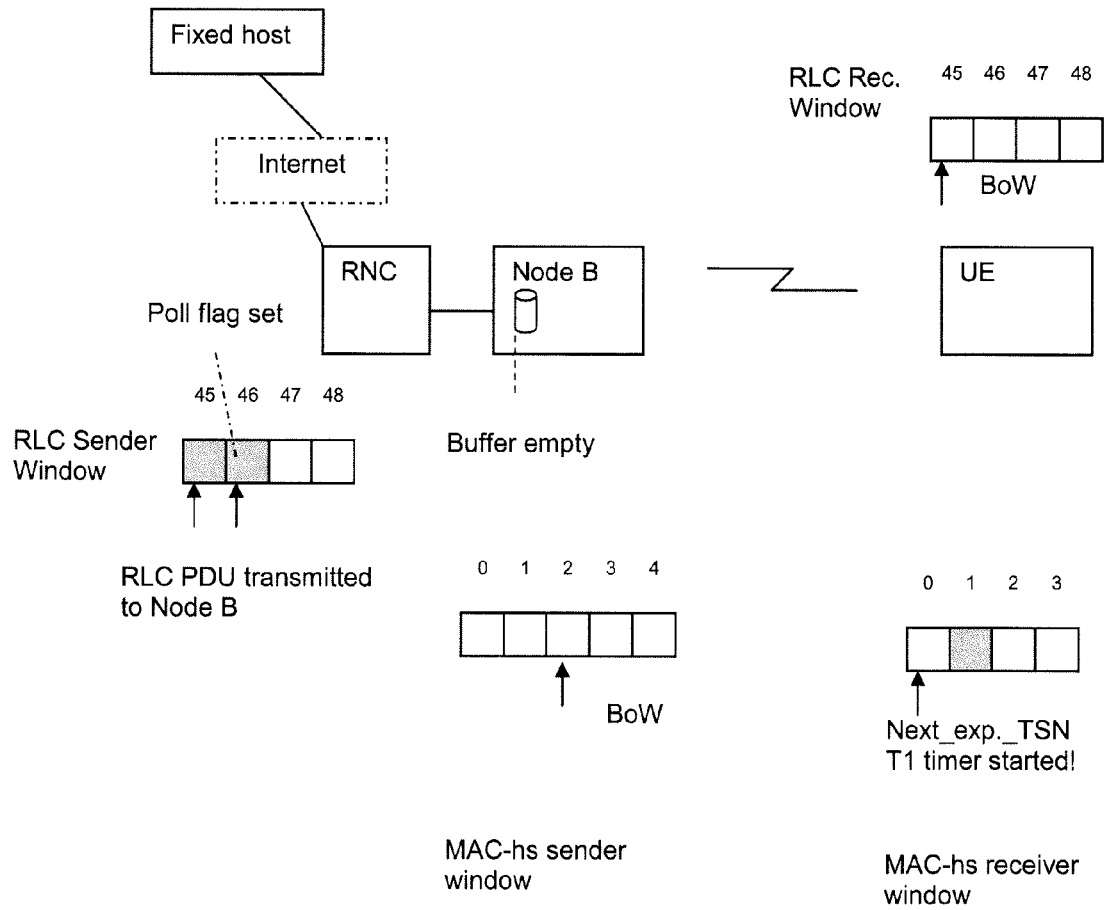
Figure 6A:
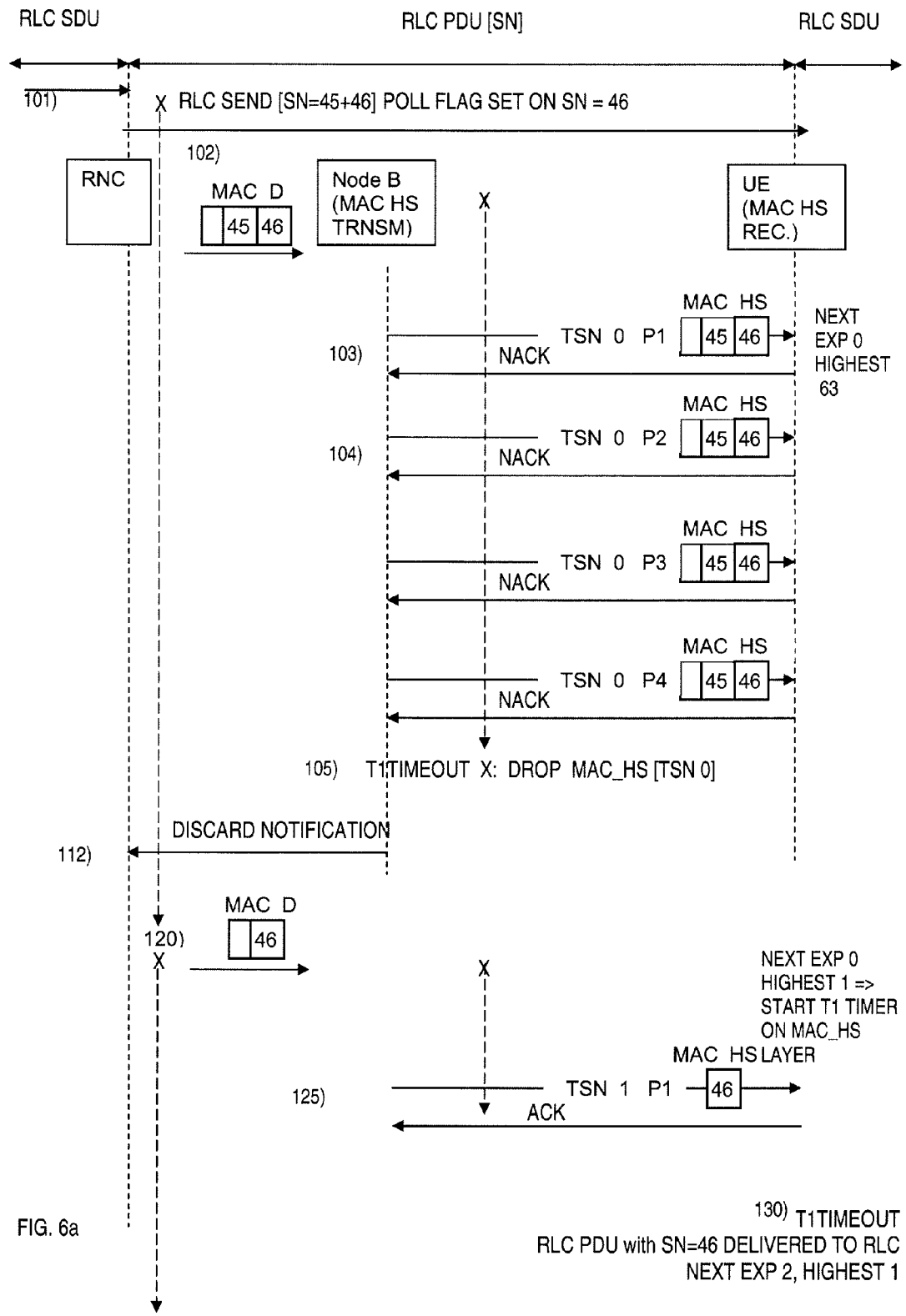

Comparison of the Present Invention with the Prior Art Under Exemplary Scenarios FIGS. 6*a*+6*b*

Figure 6B:
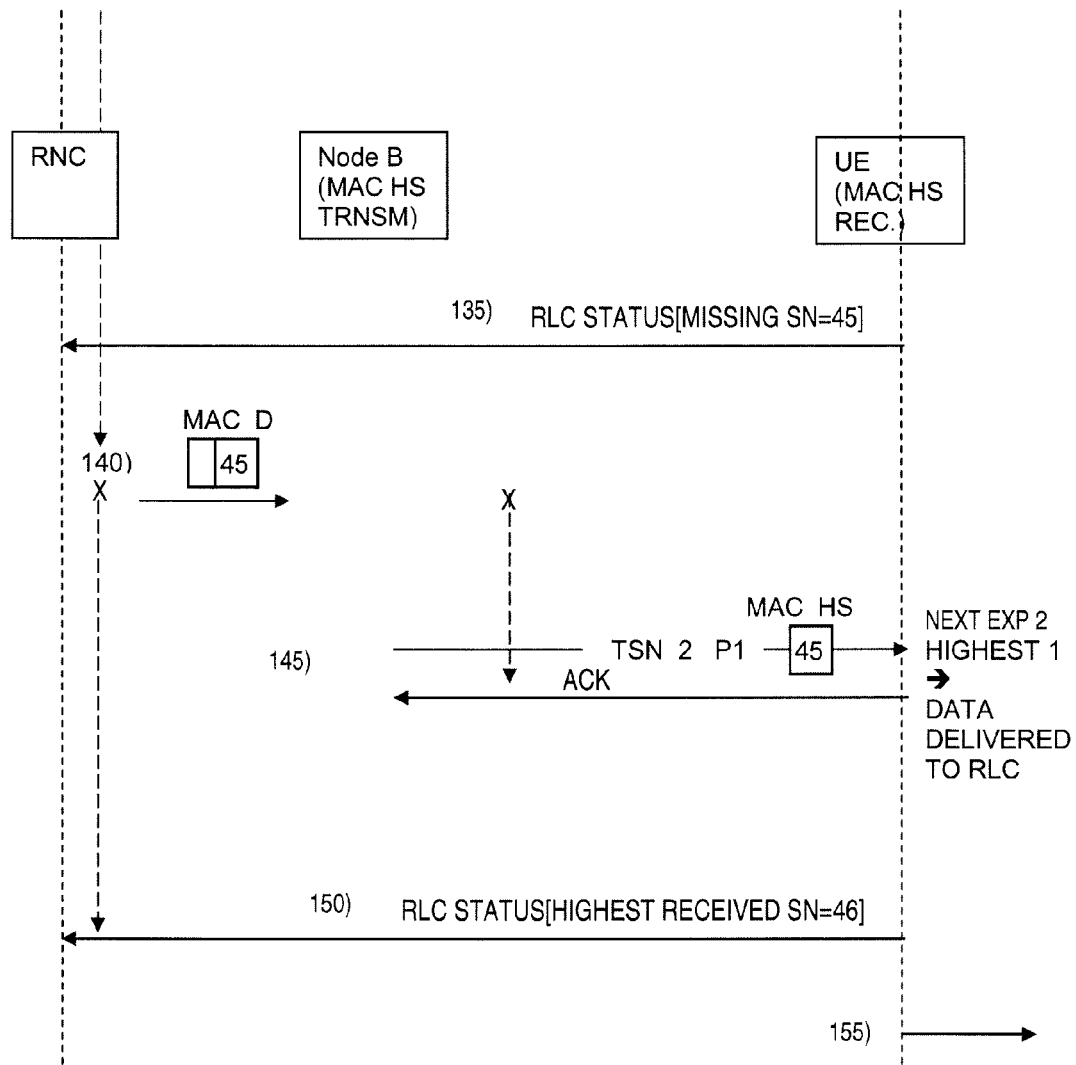

In FIGS. 6*a* and 6*b*, an exemplary handshake diagram according to the first embodiment of the invention is shown pertaining to an exemplary scenario in which the following steps occur/are carried out:

101) A small amount of data is received at the RNC for a particular user. (E.g. Assume the user starts a downlink TCP session towards the UE and TCPs speed is about to ramp up.)

102) RNC transmits the received data in two MACd PDU's to Node B with sequence number 45 and 46. RNC sets the POLL FLAG on the last sent PDU (SN 46) to reassure that either a) data is correctly received at the UE or b) if delivery fails, the RNC will trigger a retransmission when the POLL FLAG timer expires.

103) NODE B transmits data in a single MAChs PDU with TSN=0.

104) NODE B retransmits data due to a NACK (or no response [DTX]) from the UE. NODE B continues with this step until step 105 occurs.

105) Node-B Discards the MAChs PDU with TSN=0, since the T1 timer expires corresponding to step 2, FIG. 9.

112) Node B transmits a DISCARD notification to the RNC according to step 5, FIG. 9.

120) the DISCARD notification is received by the RLC layer of the RNC, which subsequently transmits PDU with SN=46 and restarts POLL FLAG timer, corresponding to option D, step 6, FIG. 9.

Note, that as an alternative, the RNC could retransmit both SN=45 and SN=46. With this approach, the steps from and including step 140) and above could be avoided (see below).

125) Node B receives the MAC-d PDU from RNC and transmits in one MAC-hs PDU with TSN=1. UE receives data and sends an ACK, but since UE expects TSN=0 it will start its T1 timer to allow NodeB to retransmit TSN=0 (which will not occur in this example).

130) the T1 timer expires in UE MAC-hs. Next_expected_TSN is set to 2 and highest_received_TSN is set to 1. After reassembly of TSN=1 the data is delivered to RLC.

135) the RLC at the UE transmits a STATUS message identifying SN=45 as missing and SN=46 as received.

140) the RLC at the RNC receives STATUS, and retransmits SN=45 and restarts the POLL FLAG timer.

145) Node B receives the MAC-d PDU from the RNC and transmits a MAC-hs PDU with TSN=2. UE receives data and sends an ACK. Data is delivered to RLC.

150) the RLC layer at the UE transmits STATUS message identifying SN=46 as the highest received sequence number. The STATUS message may be arranged in various ways: For instance, the STATUS may indicate that up to a given sequence number everything is correctly received. The STUTUS message may also be formed as a bitmap indicating received and non-received sequence numbers.

At reception of the STATUS message, the RLC at the RNC stops the POLL FLAG timer.

155) After reassembly, the RLC at the UE delivers the RLC SDU to the upper layer.

FIG. 7 Scenario

Figure 7:
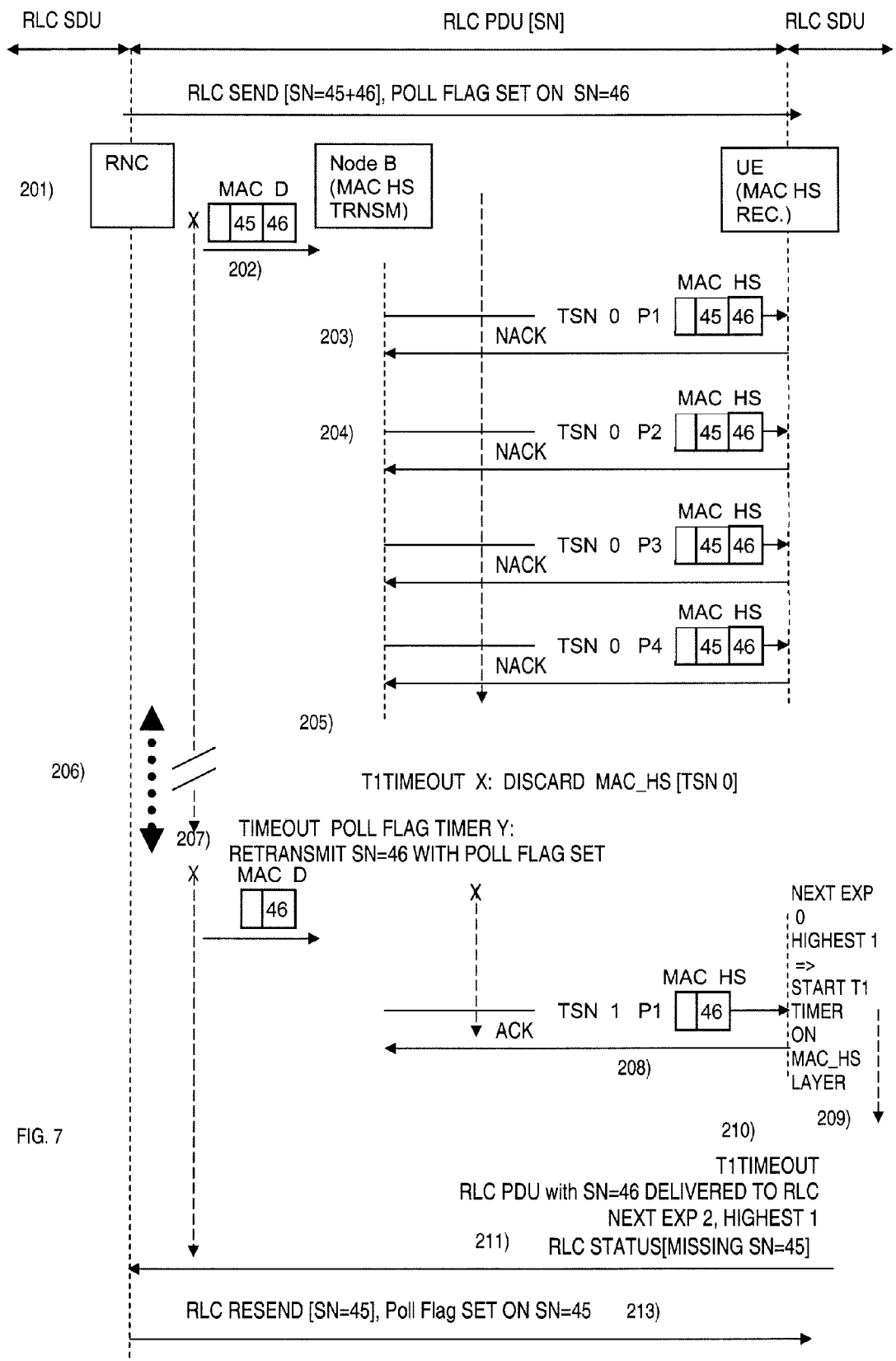
FIG. 7 shows a first comparative prior art scenario.

In FIG. 7, an exemplary handshake diagram according to the prior art is shown pertaining to an exemplary scenario comprising the following steps:

201) A small amount of data is received at the RNC for a particular user. (E.g. Assume the user starts a downlink TCP session towards the UE and TCP's speed is about to ramp up.)

202) RNC transmits the received data in two MACd PDU's to Node B with sequence numbers 45 and 46. RNC sets the POLL FLAG on the last sent PDU (SN 46) to reassure that either a) data is correctly received at the UE or b) if delivery fails, the RNC will trigger a retransmission when the POLL FLAG timer expires.

203) NODE B transmit data in a single MAChs PDU with TSN=0.

204) Subsequently, transmission and retransmission(s) are attempted—but still failure on the air interface.

205) Node-B Discards the MAChs PDU with SN=0

206) time passes

207) POLL FLAG timer expires in the RNC. The RNC can now a) retransmit 45 and 46 and set PF (Poll Flag) on last sent PDU (SN=46) or b) send last PDU with PF set (SN=46).

b) is shown in FIG.

208) Transmission by Node B is successful, but since UE expects TSN=0 it will start its T1 timer to allow NodeB to retransmit TSN=0.

209) time passes, but probably not so long as the previous timer (206)

210) T1 timer expires and Next_Exp_TSN=2, highest received TSN=1 and received data is sent to RLC.

211) the UE RLC transmits STATUS indicating SN=45 as missing and SN=46 as received.

213) SN 45 is retransmitted by the RNC

It is noticed that according the invention, the time lags 206) and the time to execute 211 and 213 are avoided which otherwise would appear respectively between steps 205)-207). The time saving corresponding to lag 206) occurs since progress will not depend on the expiry of the RNC poll flag timer.

FIG. 8 Scenario

Figure 8:
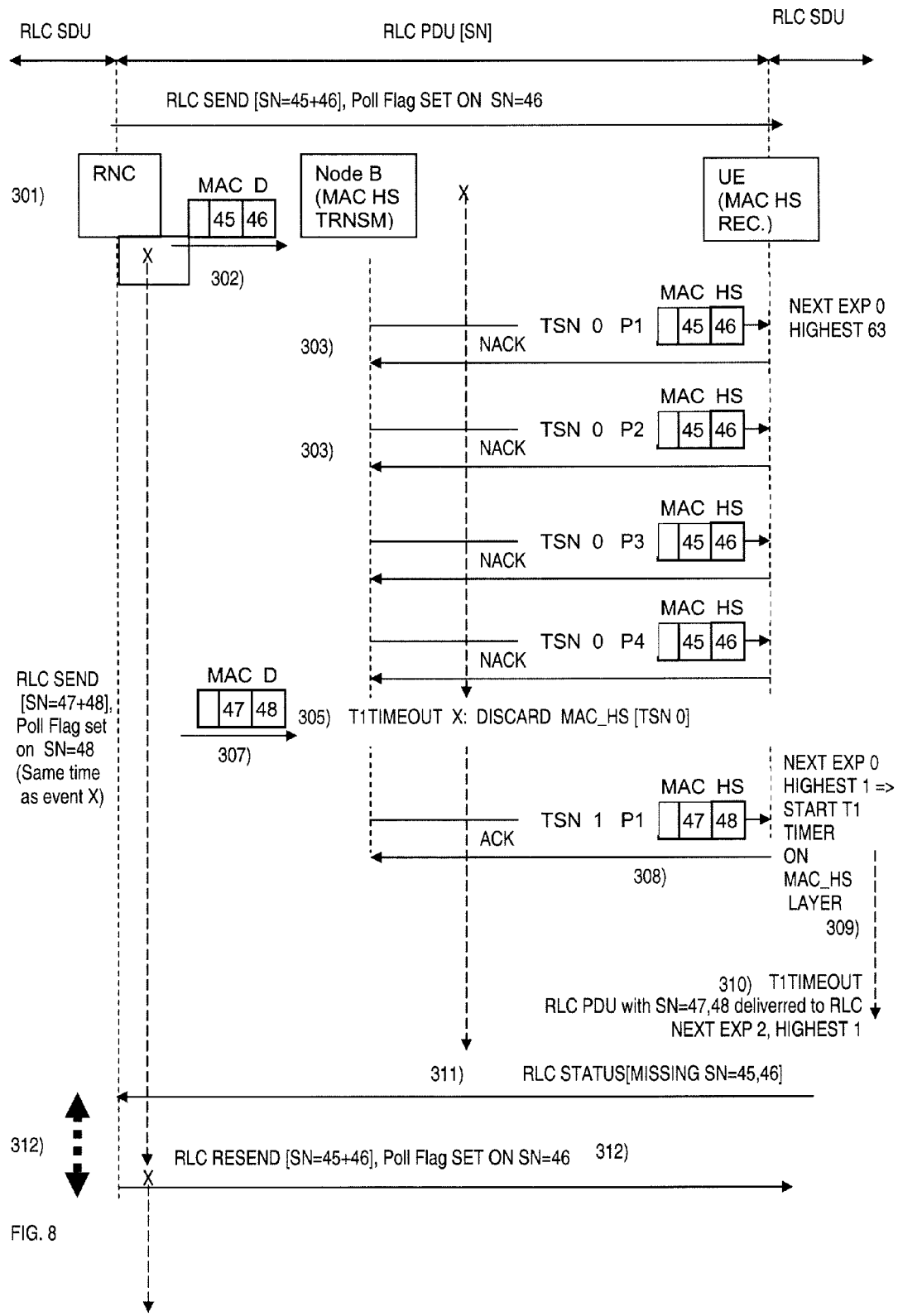
FIG. 8 shows a second comparative prior art scenario.

The scenario of FIG. 8 is similar to but differs from FIG. 7 in that RNC happens to receive more data, cf. 307), while it is waiting for the acknowledgement of SN 45, 46.

This scenario will recover faster than the scenario shown in FIG. 7, since the POLL FLAG Timer waiting time is avoided. Compared to FIGS. 6a+6b the delay will be the same if we assume step 307) occurs at the same time as 120) 1 FIGS. 6a+6b.

If the RNC in step 120) instead retransmitted both SN=45 and SN=46 the period 312) of FIG. 8 can be avoided according to the present invention.

At the time of X-step 305), the invention will send a discard notification indicating that 45, 46 were discarded. Steps 301-313 correspond largely to steps 201-213 above.

The invention claimed is:

1. A method for a base station set (NODE B) adapted for RLC and MAC-hs signaling in acknowledged mode (AM), the base station set at least forwarding protocol data units (MAC-d PDU) from a Radio Network controller (RNC) to a user entity (UE), the method comprising the steps of:
    monitoring the MAC layer of the transmission entity of the base station set; and,
    if a MAC discard has occurred in the MAC layer,
    transmitting a discard notification message from the MAC transmission entity in the base station set to the RLC layer of the radio network controller (RNC), indicative of the discarding of protocol data units.

2. The method according to claim 1, wherein the discard notification comprises information of the amount of data discarded.

3. The method according to claim 1, wherein the discard notification comprises the RLC sequence numbers (SN) of the data discarded.

4. The method according to claim 1, wherein if a MAC discard of data in the input buffer has not occurred, but a MAC discard has occurred in the MAC layer in the acknowledge mode entity and an acknowledge has been received for MAC-hs with a transmit sequence number (TSN) larger than the discarded transmit sequence number or if there are pending MAC-hs transmissions or data in the input buffer refraining from sending a discard notification.

5. A base station set for RLC and MAC-hs signaling in acknowledged mode (AM), the base station set at least forwarding protocol data units (MAC-d PDU) from a Radio Network controller (RNC) to a user entity (UE), the base station performing the operations of:
    monitoring the MAC layer of the transmission entity of the base station set, and
    if a MAC discard has occurred in the MAC layer,
    transmitting a discard notification message from the MAC transmission entity in the base station set to the RLC layer of the radio network controller (RNC), indicative of the discarding of protocol data units.

* * * * *

UNITED STATES PATENT AND TRADEMARK OFFICE
CERTIFICATE OF CORRECTION

PATENT NO. : 8,116,250 B2  Page 1 of 1
APPLICATION NO. : 12/307877
DATED : February 14, 2012
INVENTOR(S) : Lindskog et al.

It is certified that error appears in the above-identified patent and that said Letters Patent is hereby corrected as shown below:

On the Face Page, in Field (56), under "U.S. PATENT DOCUMENTS", in Column 1, Line 2, delete "2003/0015698 A1 1/2003 chang et al.".

In Column 9, Line 7, delete "5l" and insert -- 5 --, therefor.

In Column 10, Lines 61-62, delete "STUTUS" and insert -- STATUS --, therefor.

In Column 12, Line 34, in Claim 5, delete "set" and insert -- set adapted --, therefor.

Signed and Sealed this
Twenty-sixth Day of June, 2012

David J. Kappos
*Director of the United States Patent and Trademark Office*